UNITED STATES PATENT OFFICE.

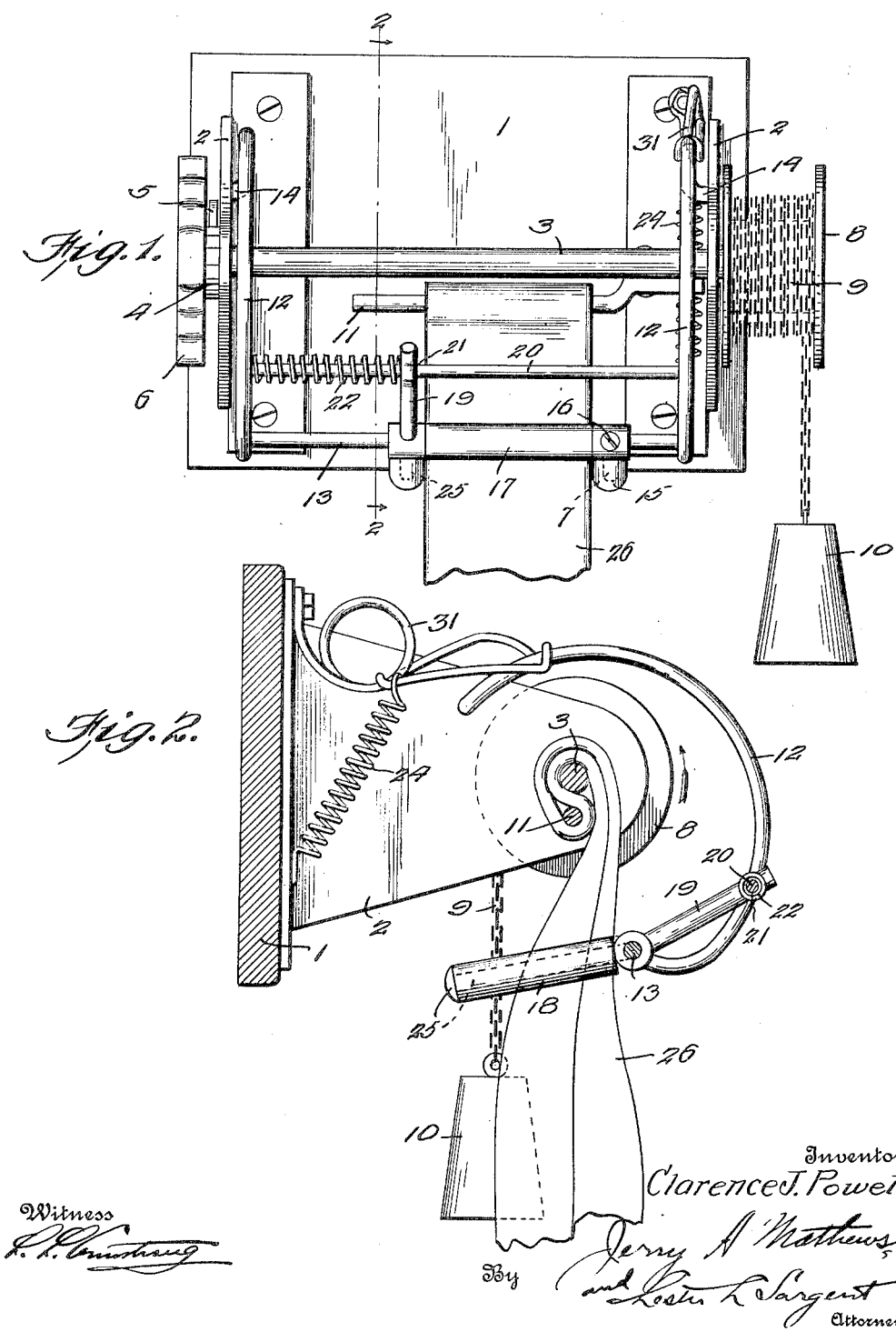

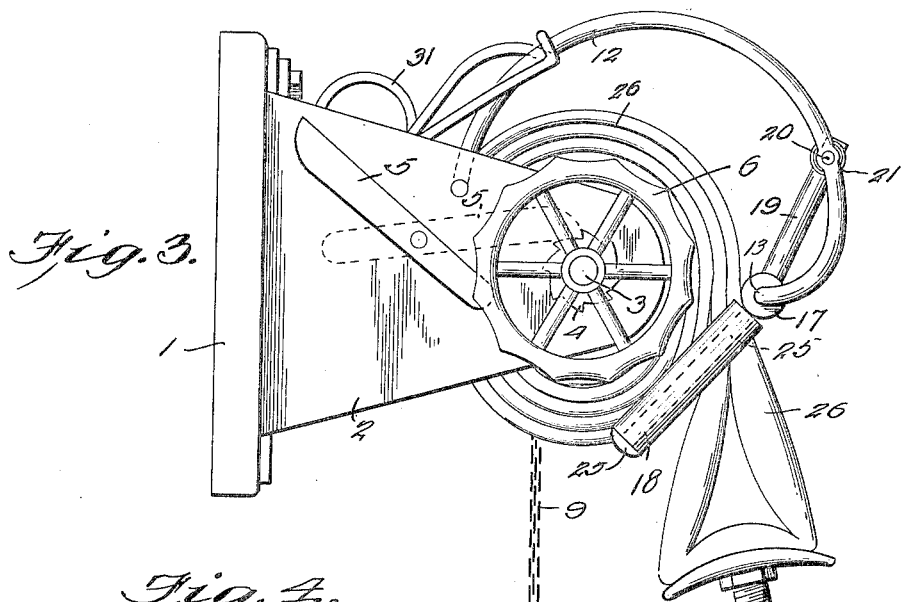
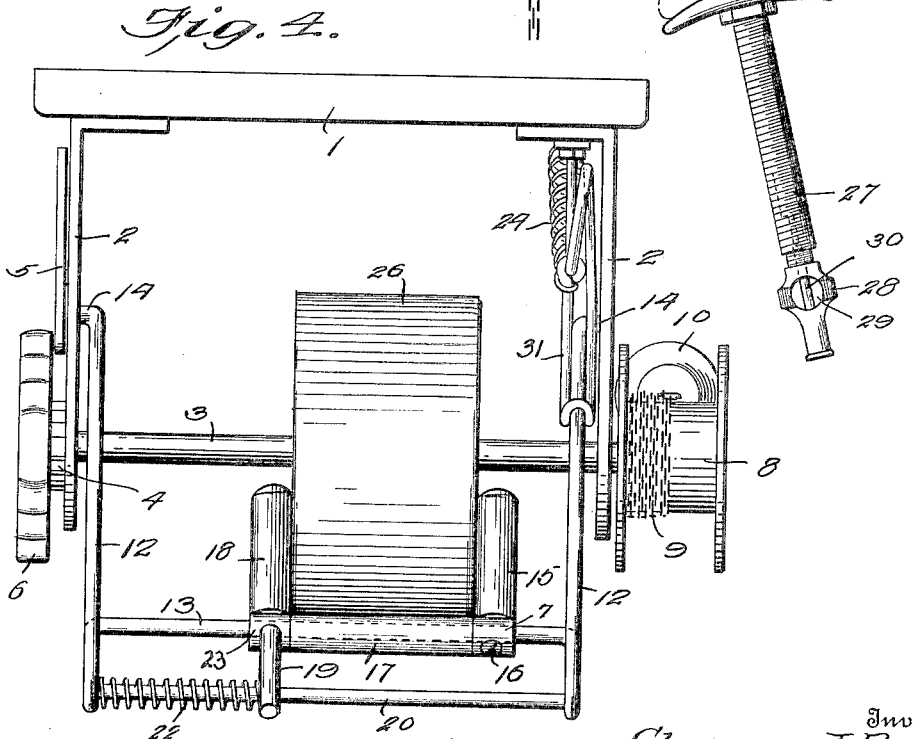

CLARENCE J. POWELL, OF ROMNEY, WEST VIRGINIA.

AUTOMATIC TIRE-TUBE DEFLATER.

1,326,465.  Specification of Letters Patent.  Patented Dec. 30, 1919.

Application filed June 26, 1919. Serial No. 307,039.

*To all whom it may concern:*

Be it known that I, CLARENCE J. POWELL, a citizen of the United States, residing at Romney, in the county of Hampshire and State of West Virginia, have invented a new and useful Automatic Tire-Tube Deflater, of which the following is a specification.

The object of my invention is to provide an apparatus adapted to automatically expel the air from the inner tubes of pneumatic tires, of the endless tube type.

Another object is to provide an appliance upon which the tube may be readily adjusted, and which is adapted to operate upon tubes of different widths, and from which the deflated tube may be removed with despatch.

A further object is to provide means adapted to hold the entire tube compressed while the valve is manipulated, and which will automatically guide the tube during the compressing operation. A still further object is to provide a novel and desirable means for operating the compressing device which will be efficient and rapid in operation. It is a further purpose to provide a novel form of guiding device, adapted to be readily moved aside to permit of convenient removal of the compressed tire from the device when necessary.

The invention has especial utility in repair shops, where vulcanizing of tires is performed, and where the workmen are enabled to proceed with other work, while the machine is automatically proceeding with the operation of expelling air from a tire tube that is to be repaired. The apparatus is also useful in expelling air from tubes that are to be stored away or packed for shipment, and which may be packed much more compactly when the air has been expelled.

I attain these and other objects of my invention by the mechanism illustrated in the accompanying drawings, in which—

Figure 1 is a front elevation of the invention, on which a tire tube has just been placed, preparatory to deflating the tube;

Fig. 2 is a vertical section on line 2—2 of Fig. 1, but with the tire tube shown in the position in which it appears just after the deflating operation has commenced;

Fig. 3 is a side elevation of the invention from the ratchet side of the appliance, and with the tire tube shown entirely deflated;

Fig. 4 is a top plan of the invention, with the parts in a similar position to that shown in Fig. 3.

Like numerals designate like parts throughout the several views.

Referring to the accompanying drawings, I provide bracket plates 2, which may be secured to the wall or preferably to a suitable baseboard 1, as illustrated. These plates extend at right angles to the wall or board to which they are secured, and support a shaft 3, which is loosely mounted so as to be rotatable, and to which is affixed a suitable prong 11, of sufficient length to permit a tire tube to be looped over same, as illustrated in Fig. 1. The ends of shaft 3 project beyond the plates 2. To one end of the shaft 3 is attached a drum 8, to which a chain 9 is attached, and to the end of which chain is attached a suitable heavy weight 10, adapted to operate the device by gravity. To the other end of shaft 3 is affixed a suitable hand wheel 6, and a ratchet wheel 4. A suitable pawl or dog 5 is adapted to engage said ratchet, to prevent operation of the device until the pawl is released, as will be understood by reference to Fig. 3 of the drawings.

I provide a novel air expelling device, consisting of arms 12 having their outturned ends 14 pivotally or loosely mounted in the plates 2, said arms preferably being curved as shown, and being connected by a bail or cross bar 13, and also being connected by a second cross bar 20. Adjustably mounted on the member 13 I provide a guide finger 7, carrying a guide roller 15, loosely mounted thereon, the finger 7 being provided with a suitable set screw 16 for securing the member in the desired adjusted position on member 13. I further provide a suitable deflating roller 17 revolubly mounted on member 13, the roller 17 being of suitable width to press against the entire width of a tire tube. I further provide a finger 23 mounted on member 13, and carrying a roller 18 similar to roller 15 and loosely mounted on finger 23. Finger 23 is provided with an extension 19, having a suitable opening 21 near its upper end through which the cross bar 20 projects and which serves as a guide for said member and for a suitable spring 22, which bears against extension 21 and tends to press it and finger 23 and roller 18 toward the edge of the tire tube 26 to suitably guide same during the process of expelling air from it.

I provide a suitable pressure member 31, preferably in the form of a spring bent as illustrated in Fig. 2 and engaging the upper portion of arms 12 to cause the cross bar 13 and the roller 17 which it carries to bear with sufficient pressure against the tire tube 26 to deflate same as it is wound on shaft 3. I further provide a suitable spring 24 attached to member 31 and to the plate 2, as shown in Fig. 2, for the purpose of reinforcing the pressure exerted by member 31 on one of the arms 12.

I provide suitable means for keeping the valve open during the deflating operation, such for example as illustrated in Fig. 3, consisting of a cap 28 having openings 29 and a valve opening finger 30 positioned to engage the valve within valve casing 27 and hold same open continuously while the tube is being deflated, without requiring any attention from the operator. Any suitable means for holding the valve open may be employed where required.

In the use of the device the handwheel is turned manually and the weight 10 is raised by the chain 9 which is wound on drum 8. The pawl 5 engages ratchet wheel 4 and holds the device stationary until it is intentionally released by the operator. The tire tube to be deflated is looped at the point farthest from the valve and the loop is engaged over the prong 11 as illustrated in Fig. 1. The ratchet is then released by the operator, who can then proceed with the work while the machine automatically proceeds with the operation of deflating the tire, the weight 10 causing the drum and shaft 3 to revolve, thus winding the tire 26 on the shaft as shown in Fig. 2, while the roller 17 carried by cross bar 13 bears with sufficient pressure against tire tube to expel the air therefrom in connection with the pressure exerted in the winding of the tube around the shaft 3. The cross bar 13 is held in effective operative position by the integrally formed arms 12 and the spring pressure member 31 which bears downwardly on one of the arms, said member 31 being reinforced by the spring 24. Member 31 is itself a spring, preferably thus exerting additional pressure on arms 12. The finger 7 carrying roller 15, which lightly engages the edges of tire tube 26 is adjustably mounted on bar 13, but is held fixed in adjusted position by the setscrew 16. The opposed finger 23, carrying guide roller 18 is held in contact with opposite edge of the tire tube by means of spring 22 which resiliently presses against extension 19 of finger 23, pressing it constantly toward the tire tube. The tire is thus perfectly guided during the winding operation so that the roller 17 will bear against the entire flat surface of the tire tube and effectively expel the air from it.

It is within the contemplation of my invention to make such modifications in the shape and arrangement of parts as may be necessary or desirable to suit the device for use under varying conditions, and it is especially within the contemplation of my invention to provide spring members of any suitable strength to exert the pressure required for performing the operations disclosed in the accompanying drawings.

I claim—

1. A device for deflating tire tubes, comprising a support, a revoluble shaft carried thereby, means to secure a tire tube upon the shaft, means to rotate the shaft, tire deflating means pivoted on the support and carrying a roller positioned to bear against the surface of the tire tube at a point below the revoluble shaft, said means being shaped and arranged to exert considerable pressure on the tire tube, and guiding means for guiding the edges of the tire tube as the air is expelled from it.

2. A device for deflating tire tubes, comprising a support, a horizontal revoluble shaft thereon, a prong element affixed to the shaft and having its major portion spaced from the shaft, a guiding air deflating yoke element pivoted inwardly of and above the shaft, said element having curved arms extending downwardly below and inwardly of the shaft when in guiding position, a guide roller on said yoke parallel to the shaft, tube guiding elements carried by said yoke element, said elements having rollers to engage the edges of the tube to obviate friction, and means to rotate the revoluble shaft.

3. A device for deflating tire tubes, comprising spaced bracket plates, a transverse shaft revolubly mounted in said plates, a yoke-like tire deflating member pivoted to the aforesaid plates and carrying a roller positioned to engage the tire tube, means for exerting downward pressure on the tire deflating element in its operative position, tire tube guiding members adjustably carried by the tire deflating member, and weight operated means for rotating the revoluble shaft to operate the device automatically.

4. A device for deflating tire tubes, comprising spaced bracket plates, a revoluble transverse shaft mounted on said plates, a ratchet carried at one end of said shaft, a pawl releasably engaging said ratchet, a drum carried on the other end of said shaft and affixed thereto, a chain on the drum, a weight carried by the chain to rotate the shaft by gravity, means for attaching a tire tube to the shaft and permitting of its convenient removal therefrom, a tire deflating element pivotally secured to the bracket plates and including a cross bar member positioned below the revoluble shaft when in deflating position, means carried by said cross bar member for guiding the edges of the tire tube, and resilient means for holding one of said guiding members in contact with the edge of the tube.

5. A device for deflating tire tubes, comprising spaced bracket plates, a revoluble transverse shaft mounted on said plates, weight operated means for rotating the shaft, manually operated means for rotating said shaft, pawl-controlled means for holding the shaft against rotation until released, a tire tube deflating element pivotally mounted on the bracket plates and comprising curved arms extending downwardly below the revoluble shaft, a cross bar member connecting said arms, said member carrying rollers bearing against the tire tube to deflate and to guide same, means for maintaining the guiding rollers in the desired guiding position, and a plurality of spring elements bearing downwardly on the tire deflating member, whereby to cause same to continuously exert considerable pressure on the tire tube during the operation of deflating.

CLARENCE J. POWELL.